United States Patent [19]

Bridges

[11] Patent Number: 4,848,791
[45] Date of Patent: Jul. 18, 1989

[54] METHOD AND APPARATUS FOR DETERMINING STEERING POSITION OF AUTOMOTIVE STEERING MECHANISM

[75] Inventor: Geoffrey F. Bridges, Ypsilanti, Mich.

[73] Assignee: Ford Motor Company, Dearborn, Mich.

[21] Appl. No.: 141,236

[22] Filed: Jan. 6, 1988

[51] Int. Cl.$^4$ .............................................. B60G 17/08
[52] U.S. Cl. .................................................. 280/707
[58] Field of Search ......................... 280/707, 94, 771; 180/79, 132, 141, 142

[56] References Cited

U.S. PATENT DOCUMENTS

| | | | |
|---|---|---|---|
| 3,608,925 | 9/1971 | Murphy | 280/112 |
| 3,895,816 | 7/1975 | Takahashi et al. | 280/6 H |
| 4,313,529 | 2/1982 | Kato et al. | 188/299 |
| 4,345,661 | 8/1982 | Nishikawa | 180/141 |
| 4,392,540 | 7/1983 | Michio et al. | 180/142 |
| 4,555,126 | 11/1985 | Ishimitsu et al. | 280/707 |
| 4,564,214 | 1/1986 | Tokunaga et al. | 280/707 |
| 4,621,833 | 11/1986 | Soltis | 280/707 |

Primary Examiner—Charles A. Marmor
Assistant Examiner—Ross Werover
Attorney, Agent, or Firm—Jerome R. Drouillard; Roger L. May

[57] ABSTRACT

An apparatus and method for determining the steering position of a steering system installed in a vehicle uses a filtering device and technique which operates with a signal representative of the steering system's motion to derive the actual steering system position with respect to a center position.

14 Claims, 5 Drawing Sheets

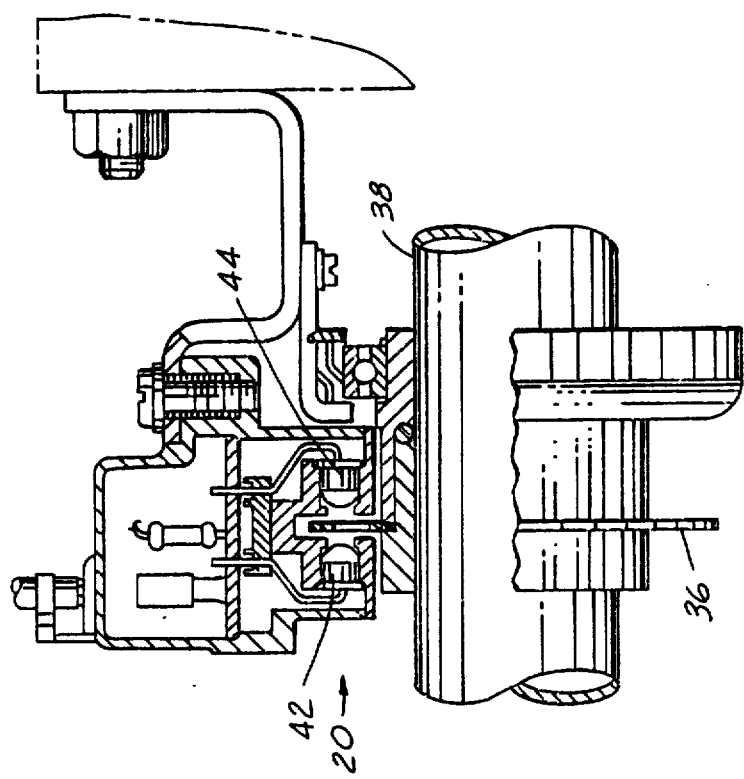
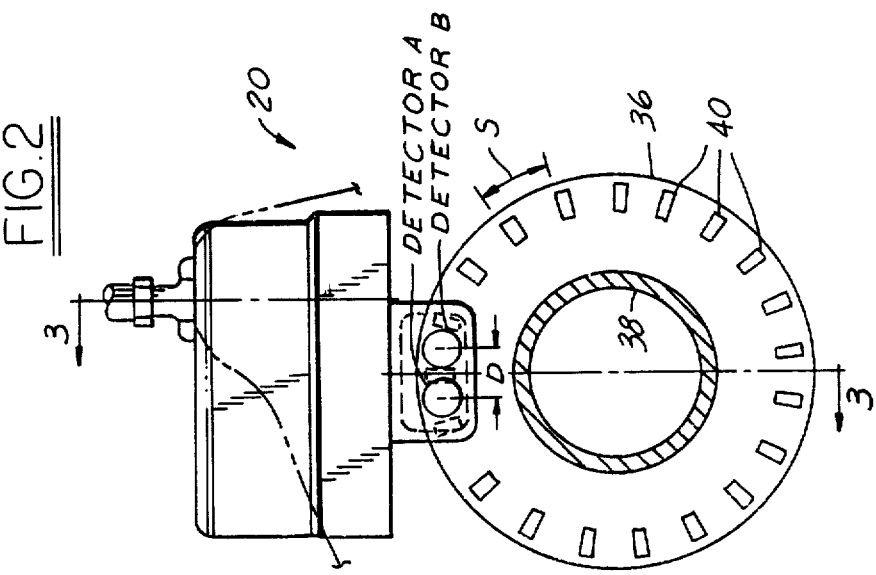

METHOD AND APPARATUS FOR DETERMINING STEERING POSITION OF AUTOMOTIVE STEERING MECHANISM

BACKGROUND OF THE INVENTION

This invention relates to a method and apparatus for determining the steering position of a vehicular steering mechanism. This method and apparatus are useful for controlling a vehicular suspension system or other automotive devices.

DISCLOSURE INFORMATION

Adaptive automotive suspension systems are known in the art. An example of such a system is shown in U.S. Pat. No. 4,621,833, which is assigned to the assignee of the present invention, and which is hereby incorporated by reference. The system of the '833 patent, as well as other known adjustable suspension systems, adjusts the damping force produced by one or more suspension units according to a plurality of inputs from different sources within the vehicle. For example, it is known from the '833 patent to control suspension units by utilizing vehicle linear acceleration, braking, steering activity, vehicle speed, predicted lateral acceleration, and other inputs.

U.S. Pat. Nos. 3,608,925, 4,345,661, 4,555,126, and 4,564,214 illustrate the use of steering inputs for the control of suspension units. A related type of control is disclosed is U.S. Pat. No. 3,895,816 in which a centrifugal force sensor is operatively associated with valving to bias the vehicle so as to prevent excessive body roll during cornering. Systems employing fixed steering angle sensors are prone to failure due to misadjustment of the sensor inasmuch as precise angular measurements must be obtainable from such sensors if they are to be employed in systems capable of correcting or anticipating and preventing excessive roll of an automobile body during a cornering maneuver. Too, such sensors are unable to compensate for changes in wheel alignment due to impacts with road obstructions or wear within the steering mechanism. A related problem affects systems employing centrifugal force sensors inasmuch as such force cannot be sensed until it exists, and once such force has come into existence the vehicle's body will typically have assumed an attitude which can be corrected only by an active suspension device capable of exerting force independently of its velocity of operation. Thus, to be effective, a device for providing steering input to a control system for operating suspension units should anticipate lateral acceleration rather than merely sense acceleration. U.S. Pat. No. 4,621,833 discloses a steering center algorithm and method for finding steering center which is suitable for use in a system capable of anticipating lateral acceleration rather than merely sensing such acceleration.

The steering sensor system disclosed in U.S. Pat. No. 4,621,833 employs a software program in which steering center position is determined through the use of a fixed sample time detection scheme operating with variably sized circumferential window zones of operation of a steering shaft. Because the sampling time associated with the algorithm of U.S. Pat. No. 4,621,833 is fixed, the system disclosed therein has a limited capacity to deal with changes in steering center position.

The steering sensor system disclosed in allowed U.S. patent application No. 046,005, which was filed on May, 4, 1987, and which is assigned to the assignee of the present invention, utilizes a software program in which steering center position is determined according to a variable sampling time strategy which may also employ a variable steering window concept.

The present invention uses a filtering technique for determining steering position. U.S. patent application Ser. No. 133,098, filed Dec. 14, 1987, which is entitled "Hybrid Suspension position and Body Velocity Sensing System for Automotive Suspension Control System", and which is assigned to the assignee of the present invention, uses a filtering technique for processing the output data from a suspension ride height sensor.

It is an object of the present invention to provide a method and apparatus for dynamically determining the steering position of a vehicular steering mechanism.

It is yet another object of the present invention to provide a method and apparatus for determining the center position of a vehicular steering mechanism which will rapidly determine a correct steering position when the system is first activated and which changes the character of data which will be accepted for calculating the steering position as time progresses.

The present invention is advantageous because it allows a precise determination of steering position with relatively less software memory, as compared with certain prior art systems.

The present invention is further advantageous because determination of steering position with this system requires less execution time as compared with certain prior art systems.

SUMMARY OF THE DISCLOSURE

In accordance with the present invention, a system for determining the steering position of an automotive steering mechanism comprises signal means for generating a first signal related to the motion of the steering mechanism and processor means for filtering the first signal so as to produce a second signal which is representative of the position of the steering system. The first signal may comprise the arithmetic sum of a series of repeating marker signals or counts which may for example comprise a series of binary coded words, which may, for example, comprise a Gray code. The signal means may comprise a rotary device operatively connected with a rotatable steering shaft, and includes a shutter wheel rotatable with the steering shaft and a pair of detector devices triggered by the shutter window such that the detector devices will generate a cyclical series of two-bit binary coded words, with each word corresponding to a finite amount of rotation of the steering shaft. The signal means may further comprise register means for determining the arithmetic sum of said marker signals.

The processor means in a system according to the present invention may include a digital filter which may, for example, comprise a bandpass filter. The bandpass filter may comprise a filter having a fixed low pass pole and a movable high pass pole. The position of the high pass pole may be regulated as a function of time. If such is the case, the high pass pole may be regulated as a function of the amount of time the system has been in operation following a period of idle time. Alternatively, the processor means may comprise a digital filter combined with an analog filter so as to constitute a bandpass filter. The digital filter may be implemented as a high pass filter having a movable pole with the pole movable as a function of time, as previously cited. The low pass filtering function of a bandpass filter according to this embodiment of the present invention could be performed by an analog filter comprising, for example, an anti-aliasing filter.

A method for determining the steering position of an automotive steering mechanism according to the present invention comprises steps of: (i) logging the number of counts or steps the steering mechanism moves from a starting position and (ii) filtering the logged steering position data with a bandpass filter means to calculate the instantaneous position of the steering mechanism. A method according to the present invention may further comprise the step of changing the position of at least one of the poles of the bandpass filter as a function of time.

BRIEF DESCRIPTION OF THE DRAWINGS

FIG. 2 is a plan view, partially cut away, of a steering sensor comprising a component part of a system according to the present invention.

FIG. 3 is a cross sectional view of the steering sensor of the present invention taken along the line 3—3 of FIG. 2.

DESCRIPTION OF THE PREFERRED EMBODIMENTS

Figure 1:
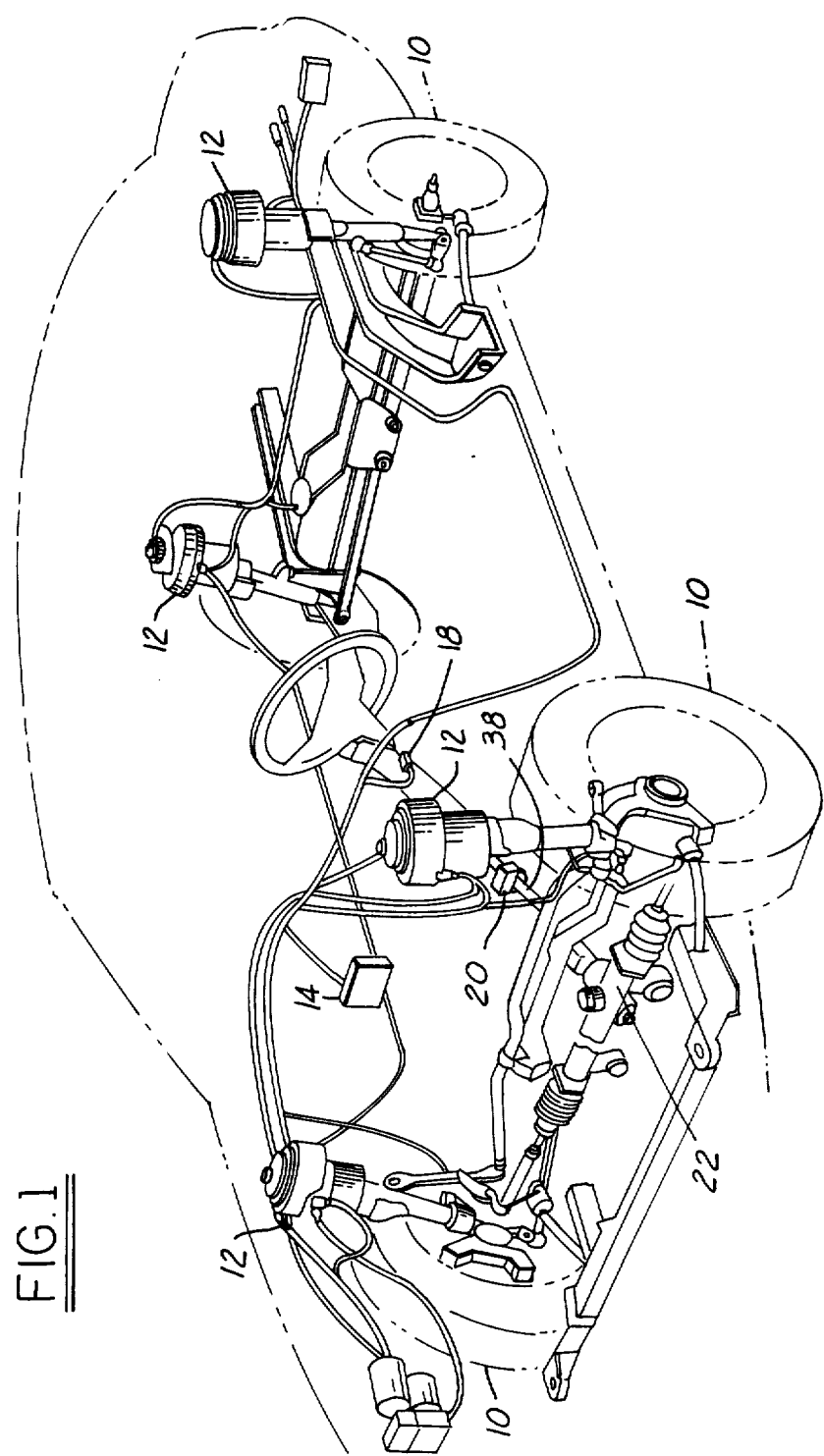
FIG. 1 is a perspective drawing of a motor vehicle including a system according to the present invention. This figure shows various components of a system embodying the present invention.

As shown in FIG. 1, a method and apparatus according to the present invention is intended for use with adjustable suspension units and steering gears typically found in automotive vehicles.

The motor vehicle shown in FIG. 1 is equipped with adjustable front and rear suspension units 12, which cooperate with wheel and tire assemblies 10. The suspension units may be constructed in a known matter such as that disclosed in U.S. Pat. No. 4,313,529, which discloses means for constructing a strut or shock absorber which is adjustable by a rotary valve positioned within one of the passageways running through the piston of the shock absorber or strut. The rotary valve functions to vary the effective cross sectional area of the passageway, thus providing an adjustable damping force. Those skilled in the art will appreciate in view of this disclosure that a system according to the present invention could be utilized to control not only adjustable suspension units and steering gears, but also other types of adjustable vehicular devices such as hydraulic crossover suspension systems, variable volume air suspension springs, or variable stabilizer bars. Similarly, a system according to the present invention could be employed with semi-active and active suspension devices.

The component parts of a system which may be used with the present invention are shown in FIGS. 1-4. Accordingly, control module 14 receives inputs from steering sensor 20, speed sensor 16, and brake sensor 18. Although not illustrated, height sensors could be employed with a suspension control system utilizing the present invention. The suspension units are illustrated in FIG. 1 as being of the variable volume air spring type operating with compressed air supplied by compressor 21. A system according to the present invention could, as previously noted, be used with other types of suspension units or other automotive equipment with which it is necessary to know the position of the steering mechanism.

Those skilled in the art will appreciate in view of this disclosure that speed sensor 16 could comprise any of a variety of devices or systems employed in automotive vehicles. It has been determined, for example, that a combined vehicle speed and distance sensor used with current model Ford Motor Company vehicles, comprising a variable reluctance alternating current generator driven by a vehicle powertrain component such as the transmission, is useful for providing a speed signal to a suspension control system.

Figure 4:
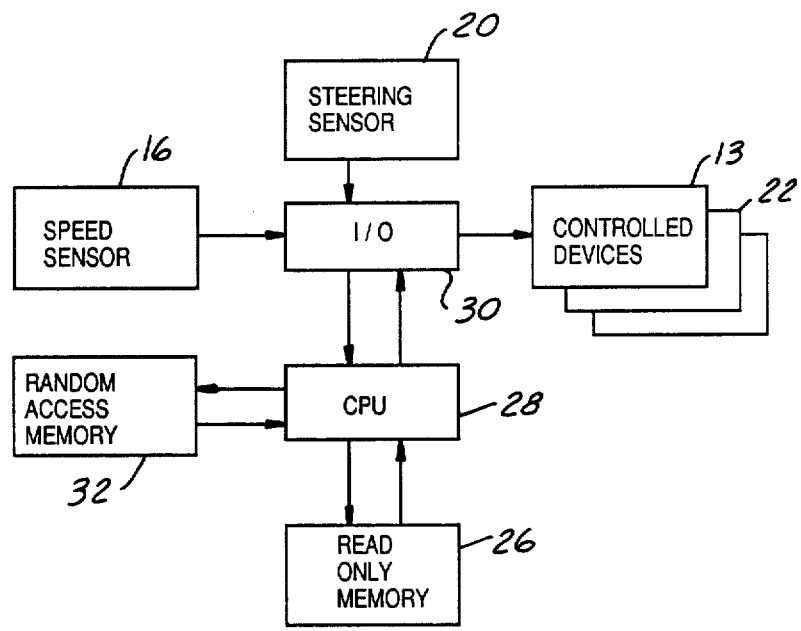
FIG. 4 is an overall system block diagram in accordance with an embodiment of this invention.

Depending upon the needs of the particular automobile being serviced by a system according to the present invention, control module 14 may output commands to suspension unit operators, 13, and to steering gear 22, (controlled devices 13, and 22, respectively, FIG. 4). Those skilled in the art will appreciate in view of this disclosure that the processor within the control module and its associated peripheral equipment could be structured according to several different architectures. In a preferred embodiment, however, (FIG. 4), the processor is configured so that a control program is sequentially read for each unit command from a read-only memory (ROM), 26, which stores preset control programs. Unit commands are executed by a central processing unit (CPU), 28. The processor integrally includes an input-output control circuit (I/O),30, for exchanging data with external devices and a random access memory (RAM),32, for temporarily holding data while the data are being processed. Those skilled in the art will further appreciate in view of this disclosure that a system according to the present invention could be implemented through the use of several types of microprocessor devices, the Intel Corp. Type 8061 and 8797 comprising but two examples of such microprocessors. In the event that a microprocessor chosen for implementing a system according to the present invention does not have a hardware multiply feature, it will be necessary to provide a multiplier function in the ROM.

Steering sensor 20, acting in conjunction with control module 14, includes means for measuring the excursion angle of the steering mechanism as a series of marker counts or steps measured from the initial position which the steering mechanism occupied when the system was activated at the beginning of a period of vehicle operation.

As shown in FIGS. 2 and 3, steering sensor 20 comprises shutter wheel 36, attached to steering shaft 38, which shaft rotates in unison with the steering wheel as the steering wheel is turned by the driver of the vehicle. Shutter wheel 36 has a plurality of apertures, 40, in this case 20 in number, which apertures serve to trigger the activity of spaced apart detectors A and B as the shutter wheel is rotated with the steering system of the vehicle. Detectors A and B detect movement of the shutter wheel. Because there are 20 apertures contained within shutter wheel 36, the steering sensor provides a signal 80 times during one revolution of the steering wheel and as a result each of the 80 counts or steps indicates 4.5 degrees of rotation of the steering mechanism.

Figures 6A, 6B:
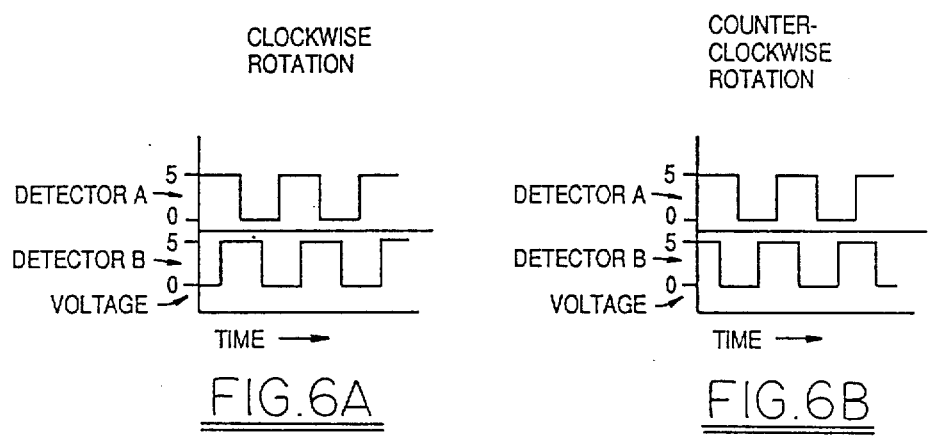
FIG. 6A illustrates the output waveforms of the detectors employed in the steering sensor illustrated in FIGS. 2 and 3 for clockwise rotation.
FIG. 6B illustrates the output waveforms of the detectors employed in the steering sensor illustrated in FIGS. 2 and 3 for counterclockwise rotation.

As shown in FIG. 3, each of detectors A and B includes a light emitting diode (LED), 42, and a photo diode, 44. The combination of the LED and photo diode is used to detect movement of shutter wheel 36 and, hence, the steering mechanism. This is possible because the photo diodes have two states—i.e., they are bistable. A conducting state occurs whenever light from the paired LED passes through an aperture 40 in the shutter wheel and impinges upon the photo diode. The output of the detector circuit then rises to approximately 5 volts. A non-conducting state exists whenever the shutter wheel blocks the transmission of light between the LED and the photo diode. As shown in FIG. 6A, clockwise rotation of shutter wheel 36 produces a waveform pattern for the detectors in which detector A undergoes its transition prior to detector B. In other words, detector A leads detector B. This results from the spacing between the detectors, shown as dimension D in FIG. 2, with respect to the spacing between the apertures, shown as dimension S in FIG. 2. More precisely, dimension D is 1.75 times dimension S. As shown in FIG. 6B, counterclockwise rotation of the steering sensor produces a waveform pattern for the detectors in which detector A undergoes its transition after detector B and detector A thus lags detector B. The outputs of detectors A and B are fed into the control module and in this manner the control module is allowed to track the direction of the steering mechanism's movement.

Figure 7:
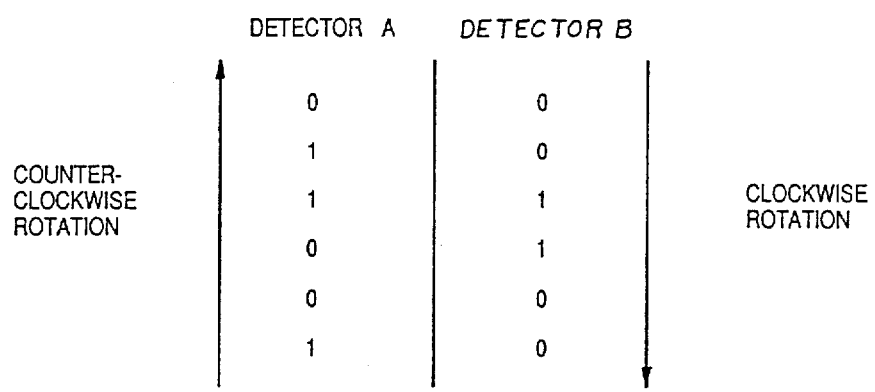
FIG. 7 is a truth table illustrating the outputs of detectors A and B shown in FIGS. 2-3 as the steering sensor of the present invention is rotated counterclockwise and clockwise.

FIG. 7 is a tabulation of the waveforms shown in FIGS. 6A and 6B in a digital format. In conventional fashion, the approximately 5 volts maximum output of the detectors is treated as a logical "1", while the zero output state is treated as a logical "0". FIG. 7 shows each of the possible logic pair states which could be output by detectors A and B. The pairs are arranged in the order in which they will be received by the control module for both counterclockwise and clockwise rotation. As seen in FIG. 7, counterclockwise rotation is read from the bottom of the figure to the upper part of the figure with clockwise rotation being read from the top of the tabulation to the lower part of the tabulation. It thus may be realized that detector devices A and B generate a cyclical series of two-bit, binary coded words, with each word corresponding to a finite amount of rotation of steering shaft 38. In essence, each code word may be considered as a count or marker or step representing 4.5 degrees of rotation of the steering shaft. As such, each count represents a small movement of the steering mechanism or system. The use of these counts or steps in a system according to the present invention will be explained in conjunction with FIG. 8.

The output of detectors A and B may be further processed by the control module to yield a signal indicating the steering mechanism's speed or angular velocity. This operation is performed quite simply by merely tracking the number of transitions of one or both detectors during a given unit of time. The number of such transitions during the sampling period will be directly proportional to the angular speed of the steering mechanism. Those skilled in the art will appreciate in view of this disclosure that although the steering sensor described herein operates according to digital electronics principles, the present invention could be practiced through the use of other types of steering sensors such as analog electronic or other types of steering sensors having the capability of generating a series of counts representing finite movements of the steering mechanism.

As noted above, the present invention uses a filtering device and technique which is applied to the output of steering sensor 20. The output of steering sensor 20 is stored within a summing register in internal RAM as the arithmetic sum of a number of counts, with the position which the steering mechanism occupied at the time the system was activated, prior to any particular period of operation, corresponding to zero counts. Counts corresponding to 4.5 degrees of rotation of the steering shaft are added and subtracted from the summing register as the steering mechanism and steering sensor are rotated. A convention must be followed so that rotation of steering sensor 20 in one direction adds positive counts to the running sum, whereas rotation in the opposite direction adds negative counts to the running sum. Accordingly, the sum of the counts may be less than zero if the steering mechanism is returned to the position which it occupied when the vehicle was started and then turned past such initial position in the "negative" direction.

Figure 5:
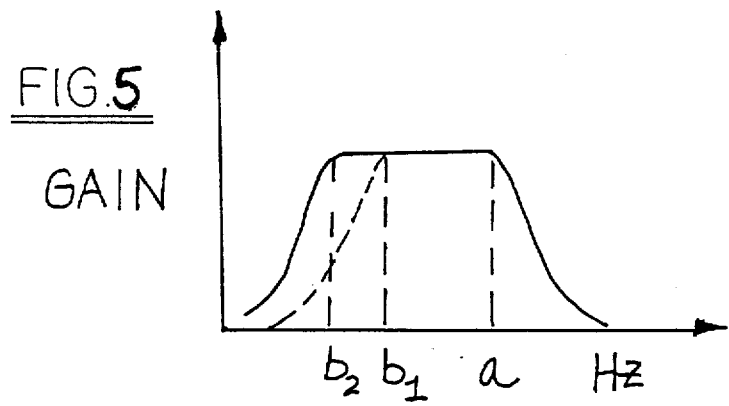
FIG. 5 is a Bode diagram for a filter comprising part of a system according to the present invention.

The output of the present filtering technique is a calculated number representing the number of 4.5 degree counts or steps at which the steering mechanism is instantaneously being operated, as measured from what is inferred to be the correct center position of the steering mechanism. FIG. 5 illustrates a Bode plot for a filter comprising an integral portion of one embodiment of a system according to this invention. The filter shown in FIG. 5 has two poles, a and b. Accordingly, the filter is a bandpass filter. This filter may be implemented entirely in software or entirely in hardware, or in both software and hardware. However, an anti-aliasing filter will be required to reject spurious signals. In a preferred embodiment, the low pass portion of the filter, as denoted by pole "a", is implemented at approximately 3 Hz. by means of an analog hardware anti-aliasing filter, which comprises a conventional resistive—capacitative filter. In this first embodiment, because the low pass portion of the filter is implemented in hardware, the position of pole a is fixed. On the other hand, the position of pole "b" is movable, as shown by the characters $b_1$ and $b_2$ of FIG. 5 position $b_1$ is the position initially taken by pole b. This position corresponds to approximately 2 Hz. Pole b is moved during the operation of an embodiment of a system according to the present invention to position $b_2$, which corresponds to 1/480 Hz., or one event in approximately 8 minutes. Those skilled in the art will appreciate in view of this disclosure, however, that it would be possible to build a system according to the present invention without having the movable pole feature described herein. Those skilled in the art will further appreciate in view of this disclosure that the choice of the frequency positions for poles a and b is similarly a matter of tuning a system according to the present invention to the particular needs of the vehicle in which the system is installed.

It is desirable to have a movable pole feature associated with the high pass portion of the filter illustrated in FIG. 5 because the movable pole, b, allows the filter to converge rapidly without being overly active. This permits a system according to the present invention to quickly provide meaningful data to the control module regarding the actual steering position of the vehicle without providing spurious signals.

According to a first embodiment of the present invention, a form of the equation for implementing the high pass portion of a filter for use according to the present invention comprises the following:

1.   $POS = A[COUNT(k) - COUNT(k-1)] + B\cdot[POS(K-1)]$ where
- $A = 2/(2 + 0.06/\tau)$
- $B = (2 - 0.06/\tau)/(2 + 0.06/\tau)$
- $T = 0.06 =$ Sample time in seconds. This is chosen arbitrarily.
- POS = instantaneous, or real, steering position, measured as a number of 4.5 degree counts, including fractional counts, from an inferred center position. POS is a real number having integer and fractional portions. The size of the counts, in terms of the number of degrees, is an arbitrary tuning variable.
- COUNT(k) = the number of 4.5 degree steps, as measured by steering sensor 20, which the steering mechanism has moved from a starting position at a time interval which is equal to the integer k times the sample time interval, T.
- COUNT(k-1) equals the number of 4.5 degree steps the steering system had moved from the starting position at the time interval equal to the integer k-1 times the sample time interval, T.
- $\tau = 1/b$, where b is equal to the position of the filter's high pass pole. $\tau$ is measured in terms of seconds. $\tau$ represents the time constant of the high pass portion of the digital filter.

After substituting the appropriate coefficients for A and B, equation 1 takes the following form:

2. $POS = 2/(2 + 0.06/\tau)[COUNT(k) - COUNT(k-1)] + [(2 - 0.06/\tau)/(2 + 0.06/\tau)]POS(k-1)$ Now, let $\tau$ vary from $\frac{1}{3}$ sec. to 480 sec.

3. Then:  $POS = 0.91743[COUNT(k) - COUNT(k-1)] + 0.83486[POS(k-1)]$ when $\tau = \frac{1}{3}$ sec.

4. and  $POS = 0.99994[COUNT(k) - COUNT(k-1)] + 0.999875[POS(k-1)]$ when $\tau = 480$ sec.

As noted above, POS is equal to the instantaneous steering excursion angle, as determined by the filter, from an inferred center position. Accordingly, in the event that the value of POS is zero, the present system will conclude that the vehicle's steering mechanism is in the straight ahead position. As noted from equations 3 and 4 above, the value of POS will tend to zero as time passes for all possible values of the coefficients A and B. Because POS tends to zero, if the vehicle is driven in the straight ahead position for a sufficient period of time the value of POS will gradually decay to zero. It should be noted, however, that as the value of $\tau$ increases, the value of POS will take longer and longer to decay. As a result, the inferred center position (zero counts for POS) will have a higher confidence level associated with it as $\tau$ increases.

As described above, the value of $\tau$ is varied from $\frac{1}{3}$ of a second to 480 seconds (8 minutes). The decision regarding what values to apply to $\tau$, in terms of both its absolute range of values, and its rate of change, is a matter of tuning the system according to the present invention to meet the requirement of a particular vehicle.

In a second embodiment, the filter portion of a system according to the present invention may be implemented entirely in software through use of the following equation:

5.   $POS = C[COUNT(k) - COUNT(k-20)] + D[POS(k-1)] - E[POS(k-2)]$ where $$C = \frac{2aT}{(2 + aT)(2 + bt)}$$

$$D = \frac{2(4 - abT^2)}{(2 + aT)(2 + bT)}$$

$$E = \frac{(2 - aT)(2 - bT)}{(2 + aT)(2 + bT)}$$

Here, "a" and "b" represent the positions of the poles shown in FIG. 5.

It would be possible to operate a system according to the present invention with either of equations 2 and 5, without changing the values of the coefficients of the various terms. If such were the case, however, the position of the high pass pole of the filter would be fixed, and the benefit of the movable pole in terms of lessened convergence time and greater sensitivity, would be lost. It should be noted that equation 2 may be implemented more economically than equation 5 in terms of software requirements because of the lesser number of arithmetic operations in equation 2.

Figure 8:
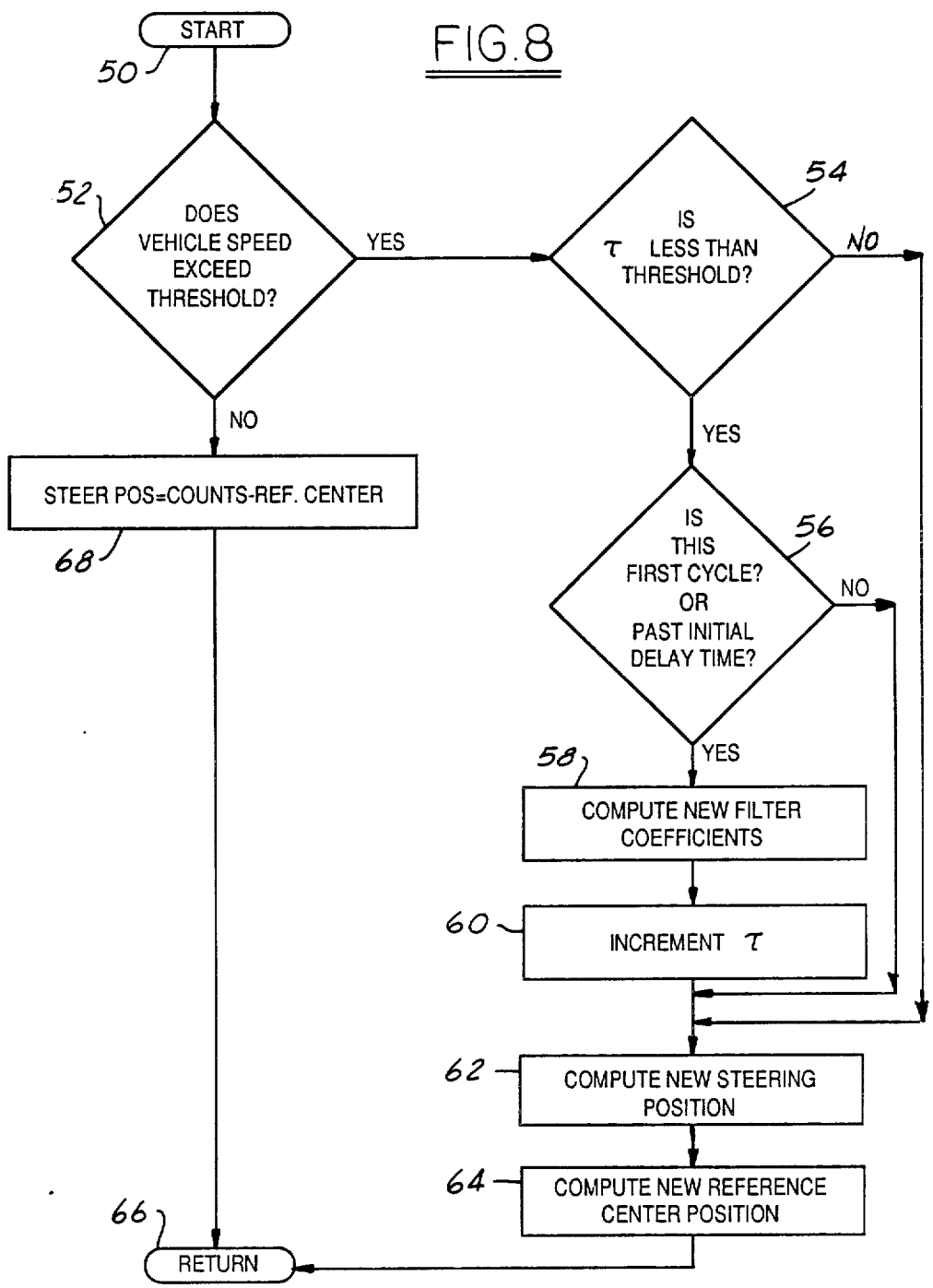
FIG. 8 contains a logic flow block diagram in accordance with an embodiment of this invention.

Turning now to FIG. 8, operation of a system according to the present invention will be further explained. At block 50, the processor starts the illustrated algorithm and moves to block 52, wherein a question is asked regarding vehicle speed. In the event that vehicle speed exceeds a threshold, which may, for example, comprise a speed approximating 15 m.p.h., the processor moves on to block 54 wherein $\tau$ is compared to a threshold tie value. The reader will recall that $\tau$ is allowed to vary from $\frac{1}{3}$ second to 480 seconds. When $\tau$ reaches the latter value, it is fixed until the system is turned off at the conclusion of any period of vehicle operation. In block 54, the value of $\tau$ is compared to 480 seconds. If $\tau$ is less than 480 seconds, the algorithm moves to block 56 wherein a pair of questions is asked. In the event that the particular cycle through the algorithm of FIG. 8 is occurring for the first time, or in the event that an initial delay time which could, for example, comprise 9 or 10 seconds, has passed, the computer moves to block 58, wherein new filter coefficients are calculated. These coefficients comprise those coefficients A and B listed for equation 1. As shown in equations 3 and 4, the recalculation of the equations causes a change in the relative contributions of the two terms of equation 1 to the value of POS, or instantaneous steering position. Following the computation of new filter coefficients at block 58, the algorithm moves to block 60 wherein $\tau$ is incremented by the sample time interval which could, for example, be 60 milliseconds. The computer then moves to block 62 wherein the new steering position is calculated by applying the newly computed filter coefficients to equation 2. During each recalculation of equation 2, the computer calculates a new instantaneous steering position for the steering mechanism. Having done this, the computer moves to block 64 where a new reference center position is determined.

The reference center position is used only when the vehicle speed does not exceed the threshold of block 52. In other words, when the vehicle speed is less than, say, 15 m.p.h., the reference center position will be used. The reference center position is equal to the value of the COUNT variable at any time minus POS. In the event that the vehicle speed drops below the threshold of block 52 which in this case, has been specified as being 15 m.p.h., a steering position detecting system according to this invention will nevertheless have the capacity to provide non-filtered data regarding the steering position, for as shown in block 68, a steering position which equals the value of the arithmetic difference between the COUNTS and reference center variables may be calculated. For example, if the COUNTS at any particular time are equal to 30 and the reference center is equal to 15, the computer will know that the steering position is 15 COUNTS either clockwise or counter clockwise, as the case may be from the reference center. This information may be fed to a control algorithm for the steering gear or suspension or some other system of the vehicle.

Continuing with the algorithm of FIG. 8, once $\tau$ reaches a value of 8 minutes, the question at block 54 will be answered in the negative, and new coefficients for equation 2 will not be calculated. The computer will then continue to update POS with each loop through the algorithm of FIG. 8 using the final values for the coefficients shown in equation 4.

Once the updated steering position has been determined, knowledge of the steering position can be used as follows. First, in the event that a large value of POS is calculated, such as when the motor vehicle is in a parking maneuver, the amount of power assist provided to steering gear 22 may be increased markedly. If, however, only a small steering angle, POS, is sensed and calculated, such as when the vehicle is traversing a relatively straight roadway, the amount of power assist provided to the steering gear may be reduced drastically. In the case of adjustable suspension unit operators 13, where a system according to the present invention calculates a suitably large POS, the suspension unit operators may be directed to assume an appropriate level of damping and/or vehicle height control.

Various modifications and variations will no doubt occur to those skilled in the arts to which this invention pertains. For example, the particular sensors used in conjunction with the disclosed system may be varied from those herein and the system may be operated according to various control constants and with other values for the variables contained within the calculational scheme described herein. These and all other variations which basically rely on the teachings by which this disclosure has advanced the art are properly considered within the scope of this invention as defined by the appended claims.

I claim:

1. A system for determining the steering position of an automotive steering mechanism, comprising:
    signal means for generating a first signal related to the motion of said steering mechanism; and
    processor means for filtering said first signal so as to produce a second signal representative of the position of said steering system, with said processor means comprising a digital bandpass filter having a fixed low pass pole and a movable high pass pole.

2. A system according to claim 1 wherein the position of said high pass pole is a function of time.

3. A system according to claim 2 wherein the position of said high pass pole is a function of the amount of time said system has been in operation.

4. A system according to claim 3 wherein the amount of time said system has been in operation is set equal to zero whenever said vehicle remains idle for a predetermined period of time.

5. A system for determining the steering position of an automotive steering mechanism, comprising:
    signal means for generating a first signal related to the motion of said steering mechanism; and
    processor means for filtering said first signal so as to produce a second signal representative of the position of said steering system, with said processor means comprising a digital high pass filter having a movable pole combined with an analog filter.

6. A system according to claim 5 wherein the position of said movable pole is a function of time.

7. A system according to claim 6 wherein the position of said pole is a function of the amount of time said system has been in operation.

8. A system according to claim 7 wherein the amount of time said system has been in operation is set equal to zero whenever said vehicle remains idle for a predetermined period of time.

9. A system according to claim 7 wherein the position of said pole is fixed after said system has been in operation for a predetermined amount of time.

10. A system according to claim 5 wherein said analog filter comprises an anti-aliasing filter.

11. A system for determining the steering position of an automotive steering mechanism, comprising:
    signal means for generating a first signal related to the motion of said steering mechanism, with said signal means comprising a rotary device, operatively connected with a rotatable steering shaft, for generating repeating marker signals representing rotation of the steering shaft, with said marker signals corresponding to the direction and distance the steering mechanism has been moved from a starting position, and means for accumulating an arithmetic sum of said signals, with said sum steering system has moved during any period in which the sum is calculated, and with said signal means further comprising means for transmitting said sum as said first signal; and
    processor means for filtering said first signal so as to produce a second signal representative of the position of said steering system, with said processor means comprising a digital high pass filter with a movable pole, combined with an analog low pass filter.

12. A system according to claim 11 wherein the position of said movable pole is a function of the amount of time said system has been in operation.

13. A system according to claim 12 wherein said movable pole is a function of the amount of time said system has been in operation at a vehicle speed above a predetermined threshold.

14. A method for determining the steering position of an automotive steering mechanism, comprising the steps of:
    logging the number of steps the steering mechanism moves from a steering position;
    filtering said logged steering position data with a bandpass filter means to calculate the instantaneous position of said steering mechanism; and changing the position of at least one of the poles of said bandpass filter as a function of time.

* * * * *